Patented May 24, 1949

2,471,297

UNITED STATES PATENT OFFICE 2,471,297

PRODUCTION OF PALLADIUM ARTICLES

Ralph Hall Atkinson, Westfield, and George Paul Gladis, Bayonne, N. J., assignors to The International Nickel Company, Inc., New York, N. Y., a corporation of Delaware No Drawing. Application November 8, 1945, Serial No. 627,538

8 Claims. (Cl. 113—112)

The present invention relates to the production of articles made of palladium and its alloys and to the soldering of palladium and its alloys.

It has been customary heretofore to use an oxy-city gas or oxy-hydrogen torch flame for annealing and/or soldering palladium and its alloys, e. g., with the "platinum solders." This practice was in harmony with the torch melting practice of using a torch fed with oxygen and hydrogen or with oxygen and city gas to melt palladium and its alloys. In either case, it was recommended that the torch flame be strongly reducing because of the strong tendency of palladium, when molten, to dissolve oxygen, and when solid, to blister if oxygen had been dissolved in the palladium.

Manufacturers of jewelry and other articles made of palladium and its alloys, particularly the makers of hand-made jewelry which requires numerous annealing and soldering operations involving alternate heating and cooling, encountered difficulty in annealing and/or soldering palladium and its alloys in the customary manner. The metal developed brittleness, the surface deteriorated and the color darkened considerably so that, even after some polishing, the surface no longer exhibited the bright surface color of palladium which is substantially identical to that of platinum. Brittleness, of course, reduces the ductility, limits the number of bending operations which can be performed on the metal and in general is very detrimental. Surface deterioration is a roughening effect which impairs the brightness and smoothness of the surface and prevents the metal from taking a bright polish. We have found that surface deterioration is accompanied by intergranular fissures extending inward from the heated surface. These fissures in the grain boundaries are often accompanied by a sub-surface zone of porosity inside the grains. In the tests which we have conducted, the surface deterioration has extended to a depth of as much as $3 \times 10^{-3}$ inch below the surface. The darkening in color has been considered a serious problem because the dark color can only be removed by polishing away the surface to an appreciable depth. This darkening in color is to be distinguished from the transient color due to a thin oxide film which forms when the metal is heated in air between about 400° C. and 800° C. The latter oxide film may be violet, blue, green, pink or black depending upon the thickness of the film but can be readily removed by dipping in warm dilute formic acid, e. g., a 5% aqueous solution, or in warm methanol without affecting the intrinsic brightness of the surface. In contra-distinction, the darkening in color referred to hereinbefore is not affected by such treatments. This darkening in color is objectionable. Thus, when the darkening occurs on the metal of diamond settings, first-quality diamonds seem like second-quality diamonds because the apparent brilliance of the precious stones is decreased.

The embrittlement, surface deterioration and darkening of palladium and its alloys during annealing or soldering has been variously attributed to the presence of sulfur in the gas employed in the torch, to the palladium itself and to alloying elements, such as ruthenium, in palladium alloys. Thus, some jewelers who had been using the oxy-city gas torch for soldering platinum for more than a generation without experiencing any difficulties ran into trouble when they used the same torch and same solders for soldering palladium and palladium-base alloys such as ruthenio-palladium, an alloy containing about 2.5% to 6% or more, e. g., up to 10%, of ruthenium and the balance substantially all palladium, and blamed the metal for the bad results. Although many attempts have been made to remedy the foregoing difficulties and to solve the foregoing problem, none, as far as we are aware, was entirely successful when carried into practice commercially.

We have discovered that whereas reducing oxy-city gas and oxy-hydrogen torch flames can be employed in annealing, soldering or heating platinum and its alloys, reducing oxy-city gas, oxy-hydrogen and like flames should be avoided in annealing, soldering or heating palladium and its alloys; that the aforementioned difficulties encountered in the annealing, soldering or heating of palladium and its alloys are not due to the sulfur in the gases employed in the torch and are not due to the palladium or elements alloyed therewith; and that the use of a neutral to oxidizing flame of acetylene and oxygen in annealing, soldering or otherwise heating palladium and its alloys does not embrittle the metal or deteriorate the surface or darken the color.

It is an object of the present invention to provide an improved method for heating solid palladium and its alloys in fabricating articles therefrom such as by soldering, annealing and the like.

It is another object of the invention to provide a method of soldering palladium and its alloys which will not embrittle the metal.

It is still another object to provide a method of soldering palladium and its alloys which will not deteriorate the surface.

It is a further object of the invention to provide a method of soldering palladium and its alloys which will not darken the color of the surface.

It is also an object to provide a method of soldering palladium and its alloys which permits the safe use of higher melting point solders than could be employed heretofore.

It is also a further object of the invention to provide a method of fabricating soldered jewelry made of palladium and its alloys.

Other objects and advantages of the invention will be apparent to those skilled in the art from the following description.

The invention provides an improved method of fabricating articles made of palladium and its alloys by heating the metal with a torch flame which comprises heating the metal with a non-reducing torch flame of acetylene gas and a gas containing free oxygen. The invention is particularly applicable to the production of soldered articles made of palladium and its alloys and in this embodiment comprises soldering the same with the aforementioned non-reducing flame of acetylene gas and a gas containing free oxygen. Suitable flames are the neutral and oxidizing flames of oxygen and acetylene and of air and acetylene, i. e., neutral to oxidizing oxy-acetylene and air-acetylene flames. In applying the invention to soldering, any conventional solder may be employed, e. g., the well-known platinum solders. Palladium and palladium-base alloy articles, such as jewelry, chemical apparatus, articles used in the dental field, etc., fabricated in accordance with the invention with a neutral or oxidizing torch flame of acetylene and free oxygen, including an air-acetylene flame, are substantially free from embrittlement, surface deterioration, sub-surface porosity and darkening in color, i. e., they are ductile, retain the bright, smooth surface and retain the light, bright color characteristic of non-soldered or non-annealed palladium and palladium-base alloys.

The markedly improved results obtained by the use of an oxy-acetylene flame are surprising in view of the fact that carbon has been generally considered harmful to platinum-group metals. Because of the high carbon content of acetylene, this gas has been deemed detrimental to platinum-group metals and its use has been avoided, e. g., in melting, annealing, etc. We have discovered that in fabricating articles of palladium and its alloys, including soldering the same, neutral to oxidizing oxygen-acetylene flames are highly beneficial in preventing the impairment of the metal during fabrication by heating, for example, in soldering or annealing the metal.

We have found that neutral to oxidizing oxygen-acetylene flames, including air-acetylene flames, have the further advantage that they permit the use of solders with higher melting points. The oxy-city gas and oxy-hydrogen torch flames employed heretofore are relatively large and tend to melt the palladium or palladium-base alloy as well as the solder with the result that only solders of relatively low melting point could be used for fear of melting the palladium or palladium-base alloy. However, the low melting point solders have the disadvantage that they "burn" easily, whereas other solders with higher melting points which are free from non-precious alloy elements do not "burn." The gas mixtures contemplated by the present invention permit the use of a small flame, thereby making possible the use of solders having higher melting points without fear of melting the palladium or palladium-base alloy. In general, it is preferred that as small a flame as practicable be employed, using an appropriate size of jet orifice.

While reducing, neutral and oxidizing oxy-hydrogen and oxy-city gas torch flames all look so much alike that it is only possible to distinguish between strongly reducing flames on the one hand and strongly oxidizing flames on the other, the oxidizing, neutral and reducing oxy-acetylene and air-acetylene torch flames are easily distinguished and can be controlled within narrow limits. The reducing or "carburizing" flame of acetylene and oxygen, including air, can be recognized by a second luminous cone of a distinctly greenish color surrounding a white inner cone and extending into the outer envelope. The neutral flame of the aforementioned gases has a well-defined white inner cone without any greenish tinge at its tip. The oxidizing flame of said gases has a shorter and more sharply-defined inner cone which is less luminous. In contra-distinction, there are no clearly defined differences between the reducing, neutral and oxidizing flames of oxygen and city gas, oxygen and hydrogen, and oxygen and carbon monoxide. In all these latter flames, only one cone appears within the flame envelope.

The markedly improved results obtained by using the flames contemplated by the present invention are illustrated by the following data showing the properties of the original alloy and the effects of various flames upon a palladium-ruthenium alloy containing about 4.5% ruthenium and 95.5% palladium:

| No. | Torch Gas Mixture | Flame Condition |
|---|---|---|
| 1 | none | none. |
| 2 | oxygen-city gas | reducing. |
| 3 | oxygen-hydrogen | Do. |
| 4 | oxygen-carbon monoxide | Do. |
| 5 | oxygen-city gas (borated) | Do. |
| 6 | oxygen-acetylene | Do. |
| 7 | ----do---- | neutral. |
| 8 | ----do---- | oxidizing. |

| No. | Ductility, 90° Bends | Surface Deterioration | Sub-Surface Porosity Penetration |
|---|---|---|---|
| 1 | 38 | none | none. |
| 2 | 5 | very porous surface and deep deterioration to depth of $3 \times 10^{-3}$ inch. | intergranular penetration and porosity within grains. |
| 3 | 8.5 | fine surface porosity and deep deterioration to depth of $2.5 \times 10^{-3}$ inch. | Do. |
| 4 | 8.5 | irregular deterioration | intergranular penetration. |
| 5 | 11.5 | fine surface porosity | some intergranular penetration. |
| 6 | 41 | slight shallow surface deterioration. | none. |
| 7 | 48 | none | Do. |
| 8 | 52 | ----do---- | Do. |

The embrittlement and impairment of the metal resulting from the use of oxy-city gas, oxy-hydrogen and oxy-carbon monoxide flames are clearly brought out by No. 2 to No. 5 in the schedules. The embrittling effects are shown by the ductility data which give the number of alternate 90° bends in one direction and then in the reverse direction, around a radius of about 0.15 inch, which the metal heated by various flames could withstand before it broke. The impairment of the metal is demonstrated by the surface deterioration and sub-surface porosity penetration resulting from the use of the various flames. No. 1 shows the properties of the metal before treatment with the various flames. No. 7 and No. 8 illustrate the properties of the same metal when flames contemplated by the present invention were used. The data demonstrate the markedly superior results obtained when these flames were employed. No. 6 illustrates a further advantage of the present invention, to wit, that even if the flame becomes strongly reducing, only a slight decrease in ductility occurs and is accompanied by only slight shallow surface deterioration in comparison with the detrimental effects of similar flames of the other gas mixtures. Similar tests conducted with air-acetylene flames have shown that that gas mixture gives results similar to those of oxygen and acetylene.

The oxy-city gas, oxy-hydrogen and oxy-carbon monoxide flames set forth in the foregoing schedules all impaired the original bright, light color of the metal surface, resulting in a matte surface which even after polishing is darker than the original color. In contrast, neutral and oxidizing oxygen-acetylene and air-acetylene flames do not impair the color, and the original bright, light color of the surface is retained.

Similar tests on other palladium-base compositions, including pure palladium, have confirmed the fact that the invention is applicable in general to palladium and its alloys, for example, palladium-base alloys of palladium with one or more of the metals rhodium, ruthenium, iridium, gold and silver. Illustrative examples include rutheniopalladium, palladium-rhodium alloys, palladium-ruthenium-rhodium alloys, etc.

In order that those skilled in the art may have a better understanding of the invention, the following illustrative examples are given.

Examples

Two pieces made of a palladium-ruthenium alloy containing about 4.5% ruthenium and 95.5% palladium, each piece having dimensions of about 0.25 inch by 0.188 inch by 0.10 inch thick, were placed together. Small pieces of solder were laid on the adjoining line of the two pieces, and the solder was heated with a neutral oxy-acetylene torch flame, using a No. 00 torch tip having a diameter of about 0.4 millimeter, until the solder melted and covered the joint. These operations were repeated on the other side, so that the two pieces were soldered on both sides. The foregoing procedure was repeated using a different solder each time. The following five platinum solders were employed:

| Type | Approximate Melting Point |
|---|---|
| | °C. |
| hard | 1,400 |
| medium-hard | 1,300 |
| medium | 1,200 |
| soft | 1,100 |
| extra soft | 1,000 |

The pieces made of palladium-ruthenium alloy were soldered without difficulty with each of the solders. All the solders, including the hard and medium-hard types, flowed satisfactorily. The soldered pieces were given the cold bend test described hereinbefore and exhibited no loss of ductility either at the joint or in the adjacent metal. The surfaces retained their smoothness and brightness and exhibited no surface deterioration, sub-surface porosity penetration or darkening in color.

The effects of the various flames and the improved results provided by using the torch flames, contemplated by the invention are obtained not only in soldering but also in any fabricating operation involving the heating of palladium and its alloys with a torch flame, and tests which we have conducted confirm this fact.

Although the present invention has been described in conjunction with preferred embodiments, it is to be understood that variations and modifications may be resorted to without departing from the spirit and scope of the invention, as those skilled in the art will readily understand. Such variations and modifications are considered to be within the purview and scope of the invention and the appended claims.

We claim:

1. The method of fabricating soldered jewelry made of a palladium-base alloy containing a small amount up to 10% of ruthenium which comprises soldering the jewelry with a neutral to oxidizing torch flame of acetylene and a gas containing free oxygen, said soldering involving numerous alternate heatings and coolings of the metal being soldered.

2. The method of fabricating a soldered article made of rutheniopalladium which comprises soldering the article with a neutral to oxidizing torch flame of acetylene and a gas containing free oxygen, said soldering involving numerous alternate heatings and coolings of the metal being soldered.

3. The method of fabricating articles made of rutheniopalladium by heating with a torch flame which comprises repeatedly heating solid rutheniopalladium with a neutral to oxidizing torch flame of acetylene and a gas containing free oxygen and alternately cooling the thus-heated rutheniopalladium.

4. The method of fabricating soldered articles made of palladium-base metals which comprises soldering the articles with a neutral to oxidizing torch flame of acetylene and a gas containing free oxygen, said soldering involving numerous alternate heatings and coolings of the metal being soldered.

5. The method of soldering palladium-base metals which comprises soldering the same with a neutral to oxidizing flame of oxygen and acetylene, said soldering involving numerous alternate heatings and coolings of the metal being soldered.

6. The method of soldering palladium-base metals which comprises soldering the same with a neutral to oxidizing flame of air and acetylene, said soldering involving numerous alternate heatings and coolings of the metal being soldered.

7. In the method of fabricating articles made of palladium and its alloys by numerous soldering operations conducted upon the same with a torch flame wherein the metal is subjected to numerous alternate heatings and coolings, that improvement which comprises carrying out said soldering operations upon the metal with a non-reducing flame of acetylene gas and a gas containing free oxygen.

8. In the method of fabricating articles made of palladium and its alloys by heating with a torch flame, that improvement which comprises repeatedly heating the solid metal with a neutral to oxidizing flame of acetylene gas and a gas containing free oxygen and alternately cooling the thus-heated metal.

RALPH HALL ATKINSON.
GEORGE PAUL GLADIS.

(References on following page)

REFERENCES CITED

The following references are of record in the file of this patent:

UNITED STATES PATENTS

| Number | Name | Date |
|---|---|---|
| 1,797,236 | Klausmann | Mar. 24, 1931 |
| 1,807,068 | Maulen | May 26, 1931 |
| 2,045,960 | Payne | June 30, 1936 |
| 2,226,944 | Reeve | Dec. 31, 1940 |

OTHER REFERENCES

Welding Brazing and Soft Soldering of Monel, Nickel and Inconel, Bulle. T2, p. 3, Pub. by Int. Nickel Co., 67 Wall St., N. Y. C.

Successful Soldering, Taylor, pp. 40-43, 1st ed. Pub. by McGraw-Hill Book Co., 370 7th Ave., N. Y. C. (Copy in Div. 14.)

Andell's Welders Guide, pp. 93-94, reprinted '41 by Theo. Audel & Co., 49 W. 23rd St., N. Y. C. (Copy in Div. 14.)

Hart's Welding, pp. 15-16 2nd ed., pub. by McGraw-Hill Book Co., 370 7th Ave., N. Y. C. (Copy in Div. 14.)

Welding Encyclopedia, 10th ed., p. 385, pub. by Welding Eng. Pub. Co., 506 S. Wabash Ave., Chicago, Ill. (Copy in Div. 14.)

Oxy-Acetylene Handbook, pp. 568-573, pub. by Linde Air Products Co., New York, N. Y. (Copy in Div. 14.)